(12) United States Patent
Iguma

(10) Patent No.: US 10,539,093 B2
(45) Date of Patent: Jan. 21, 2020

(54) MANUFACTURING METHOD FOR ENGINE

(71) Applicant: TOYOTA JIDOSHA KABUSHIKI KAISHA, Toyota-shi, Aichi-ken (JP)

(72) Inventor: Hiroki Iguma, Sunto-gun (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 146 days.

(21) Appl. No.: 15/726,910

(22) Filed: Oct. 6, 2017

(65) Prior Publication Data

US 2018/0106212 A1 Apr. 19, 2018

(30) Foreign Application Priority Data

Oct. 19, 2016 (JP) .................................. 2016-205349

(51) Int. Cl.
| | |
|---|---|
| *F02F 1/24* | (2006.01) |
| *B23D 79/04* | (2006.01) |
| *B23P 6/02* | (2006.01) |
| *B23Q 17/20* | (2006.01) |
| *B23P 13/02* | (2006.01) |
| *G05D 5/02* | (2006.01) |

(52) U.S. Cl.
CPC ................ *F02F 1/24* (2013.01); *B23D 79/04* (2013.01); *B23P 6/02* (2013.01); *B23Q 17/20* (2013.01); *G05D 5/02* (2013.01); *B23P 13/02* (2013.01); *F02F 2001/244* (2013.01); *F02F 2001/249* (2013.01); *F02F 2200/06* (2013.01)

(58) Field of Classification Search
CPC ............................... F01L 3/04; F02M 63/0035
See application file for complete search history.

(56) References Cited

U.S. PATENT DOCUMENTS

| | | | | | |
|---|---|---|---|---|---|
| 2,881,750 | A | * | 4/1959 | Hanink | ..................... F01L 3/04 123/188.3 |
| 3,408,995 | A | * | 11/1968 | Johnson | .................. F02B 77/02 123/668 |
| 4,398,527 | A | * | 8/1983 | Rynbrandt | .................. C08J 9/32 123/188.3 |
| 4,559,684 | A |   | 12/1985 | Pryor | |

(Continued)

FOREIGN PATENT DOCUMENTS

| | | | | |
|---|---|---|---|---|
| EP | 2175116 A1 | * | 4/2010 | ............. F02B 77/02 |
| JP | 57-129238 A |   | 8/1982 | |

(Continued)

*Primary Examiner* — Jacob J Cigna

(74) *Attorney, Agent, or Firm* — Finnegan, Henderson, Farabow, Garrett & Dunner, LLP

(57) ABSTRACT

A manufacturing method for an engine includes: preparing, as a preparing step, a cylinder head having a surface on which a ceiling surface of a combustion chamber is formed; forming, as a film formation step, a thermal insulation film on the ceiling surface; measuring, as a measurement step, a volume of the thermal insulation film; and selecting, as a selection step, a rank for an engine valve to be used in combination with the ceiling surface so as to correspond to an amount of difference of a measured volume of the thermal insulation film from a designed value of a volume of the thermal insulation film, the rank being selected from a plurality of ranks set in correspondence with thicknesses of umbrella portions of engine valves.

4 Claims, 4 Drawing Sheets

(56) References Cited

U.S. PATENT DOCUMENTS

| | | | | |
|---|---|---|---|---|
| 4,590,901 | A * | 5/1986 | Mizuhara | F02B 23/0696 123/193.6 |
| 4,774,926 | A * | 10/1988 | Adams | F02B 77/02 123/188.3 |
| 5,477,820 | A * | 12/1995 | Rao | F02B 77/11 123/193.2 |
| 5,522,371 | A * | 6/1996 | Kawamura | F02B 77/11 123/668 |
| 6,903,302 | B2 * | 6/2005 | Kim | B23K 26/34 219/121.61 |
| 7,343,273 | B2 * | 3/2008 | Kusunoki | G06F 17/5095 703/6 |
| 8,893,693 | B2 * | 11/2014 | Hijii | C25D 11/04 123/668 |
| 9,051,876 | B2 * | 6/2015 | Sato | F02B 77/02 |
| 9,683,480 | B2 * | 6/2017 | Nomura | F02B 23/00 |
| 9,822,728 | B2 * | 11/2017 | Hiratsuka | F02B 77/11 |
| 2004/0128011 | A1 * | 7/2004 | Kusunoki | G06F 17/5095 700/98 |
| 2011/0296684 | A1 | 12/2011 | Yamamoto et al. | |
| 2012/0266840 | A1 * | 10/2012 | Sakurai | F01L 3/06 123/193.2 |
| 2013/0146041 | A1 * | 6/2013 | Hijii | C25D 11/04 123/668 |
| 2013/0239924 | A1 * | 9/2013 | Sato | F02B 77/02 123/198 R |
| 2013/0255651 | A1 * | 10/2013 | Nomura | F02B 23/00 123/668 |
| 2014/0352646 | A1 * | 12/2014 | Tomita | C04B 41/89 123/193.5 |
| 2015/0275819 | A1 | 10/2015 | Nishikawa et al. | |
| 2016/0025035 | A1 * | 1/2016 | Kadoshima | C23C 18/1262 252/62 |
| 2016/0146148 | A1 | 5/2016 | Shimoda et al. | |
| 2018/0298792 | A1 * | 10/2018 | Torii | C23C 22/73 |

FOREIGN PATENT DOCUMENTS

| | | |
|---|---|---|
| JP | 2000-356165 | 12/2000 |
| JP | 2011-256730 | 12/2011 |
| JP | 2015-183640 | 10/2015 |
| JP | 2016-098407 A | 5/2016 |
| JP | 2016-173087 A | 9/2016 |
| JP | 2017-82703 | 5/2017 |

* cited by examiner

MANUFACTURING METHOD FOR ENGINE

INCORPORATION BY REFERENCE

The disclosure of Japanese Patent Application No. 2016-205349 filed on Oct. 19, 2016 including the specification, drawings and abstract is incorporated herein by reference in its entirety.

BACKGROUND

1. Technical Field

The present disclosure relates to a manufacturing method for an engine, and more particularly, relates to a manufacturing method for an engine including a cylinder head.

2. Description of Related Art

Japanese Patent Application Publication No. 2011-256730 (JP 2011-256730 A) describes a manufacturing method for a cylinder head of an engine. This method includes: a step of casting a cylinder head material having a recessed portion constituting a part of a combustion chamber; a step of cutting a contacting face of the cylinder bead material with respect to a cylinder block; a step of measuring a distance, in a height direction, from a reference plane provided on an apex of the recessed portion to the contacting face; and a step of adjusting a cutting amount of a surface of the recessed portion based on the distance. If the distance in the height direction is measured, a deviation of a capacity of the combustion chamber to its standard can be found. Accordingly, with the above method in which the cutting amount of the surface of the recessed portion is adjusted based on the distance in the height direction, the capacity of the combustion chamber can fall within a predetermined range.

SUMMARY

In the meantime, for the purpose of improving performance of the engine, a thermal insulation film may be formed on a ceiling surface of the combustion chamber, such as the surface of the recessed portion. When the thermal insulation film is formed on the ceiling surface, it is possible to increase performance (thermal insulation performance) that restrains heat generated in the combustion chamber from being dissipated outside via the ceiling surface. In the meantime, when the thermal insulation film is formed on the ceiling surface, a capacity of the combustion chamber decreases only by a volume of the thermal insulation film. Accordingly, at the time when the thermal insulation film is formed on the ceiling surface, a device to adjust the capacity of the combustion chamber in accordance with the volume of the thermal insulation film is required. However, to form the thermal insulation film on the ceiling surface means that the thermal insulation film is formed after the cutting of the ceiling surface is finished. Accordingly, it is practically difficult to cut the ceding surface after the formation of the thermal insulation film.

Instead of the cutting of the ceiling surface, a surface of the thermal insulation film can be cut after the formation of the thermal insulation film. However, a film thickness of the thermal insulation film has a high correlation with the thermal insulation performance. On this account it would be fine if the cutting is just grinding of a film surface, but in a case where the film thickness greatly decreases due to adjustment of a cutting amount of the thermal insulation film based on the distance in the height direction like the above method, a desired thermal insulation performance might not be obtained.

The present disclosure provides a manufacturing method that allows a capacity of a combustion chamber to fall within a predetermined range while avoiding cutting from being performed on a film surface more than necessary, in a case where a thermal insulation film is formed on a ceiling surface of the combustion chamber formed on a surface of a cylinder head.

A manufacturing method for an engine according to one aspect of the present disclosure includes: preparing, as a preparing step, a cylinder head having a surface on which a ceiling surface of a combustion chamber is formed; forming, as a film formation step, a thermal insulation film on the ceiling surface; measuring, as a measurement step, a volume of the thermal insulation film; and selecting, as a selection step, a rank for an engine valve to be used in combination with the ceiling surface so as to correspond to an amount of difference of a measured volume of the thermal insulation film from a designed value of a volume of the thermal insulation film, the rank being selected from a plurality of ranks set in correspondence with thicknesses of umbrella portions of engine valves.

In the manufacturing method according to the one aspect of the present disclosure, information on the rank selected in the selection step may be recorded on the surface of the cylinder head.

In the manufacturing method according to the one aspect of the present disclosure, the rank for the engine valve to be selected in the selection step may be a rank having a thickness of an umbrella portion, the thickness minimizing an amount of difference of a capacity of the combustion chamber from a designed value of the capacity of the combustion chamber in a case where the umbrella portion of the engine valve is seated on a valve sitting face, the amount of difference being caused due to the amount of difference of the measured volume of the thermal insulation film from the designed value.

In the manufacturing method according to the one aspect of the present disclosure, the thermal insolation film formed in the film formation step may be a thermal insulation film having a porous structure.

According to the one aspect of the present disclosure, it is possible to select a rank for an engine valve to be used in combination with the ceiling surface so as to correspond to the amount of difference of the measured volume of the thermal insulation film from the designed value, from the plurality of ranks set in correspondence with thicknesses of umbrella portions of engine valves. Accordingly, even if the measured volume of the thermal insulation film deviates from the designed value, an influence by the deviation of the measured volume is reduced by the thickness at the rank thus selected, so that the capacity of the combustion chamber can fall within a predetermined range. Accordingly, it is possible to avoid cutting of a film surface more than necessary and to put the capacity of the combustion chamber within the predetermined range.

According to the one aspect of the present disclosure, the information on the rank thus selected can be recorded on the surface of the cylinder head. Accordingly, it is possible to put the capacity of the combustion chamber within the predetermined range at the time when the engine is assembled actually. Further, at the time of replacing the engine valve with a new one, it is possible to prevent the capacity of the combustion chamber from changing.

According to the one aspect of the present disclosure, it is possible to select a rank with a thickness of an umbrella portion that minimizes an amount of difference of the capacity of the combustion chamber from the designed value of the capacity of the combustion chamber in a case where the umbrella portion of the engine valve is seated on the valve sitting face, the amount of difference being caused due to an amount of difference of the measure volume of the thermal insulation film from the designed value of the volume of the thermal insulation film. Accordingly, even if the measured volume of the thermal insulation film deviates from the designed value, an influence by the deviation of the measured volume is reduced by the thickness at the rank thus selected, so that the capacity of the combustion chamber can fall within a predetermined range. Accordingly, it is possible to avoid cutting of a film surface more than necessary and to put the capacity of the combustion chamber within the predetermined range.

According to the one aspect of the present disclosure, it is possible to manufacture an engine that can demonstrate a high thermal insulation performance by a thermal insulation film having a porous structure.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

With reference to drawings, the following describes an embodiment of the present disclosure. In the following description, elements common in all the drawings have the same reference sign and redundant descriptions thereof are omitted. Further, an applicable embodiment of the present disclosure is not limited to the following embodiment.

Figure 1:
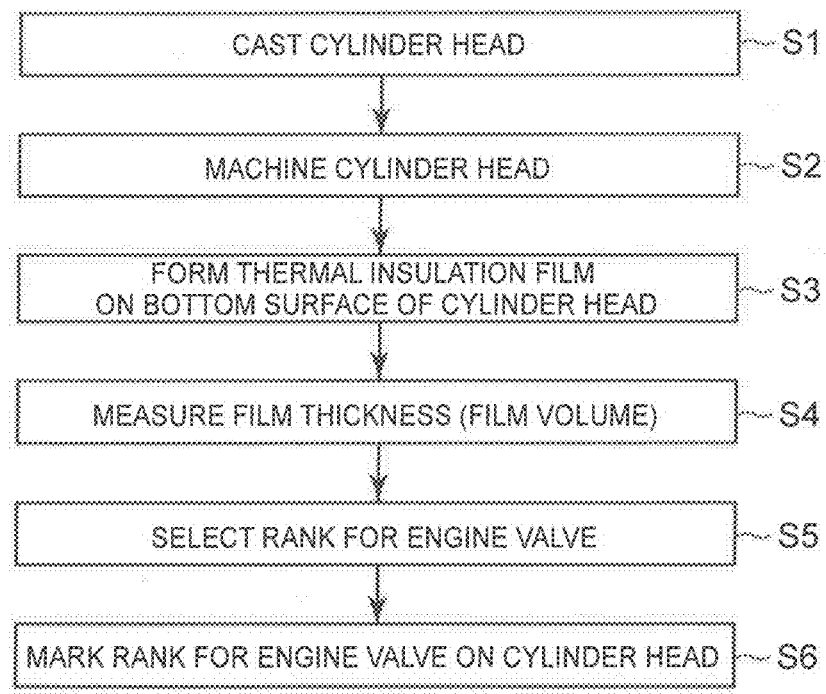
FIG. 1 is a flow diagram to describe a manufacturing method for an engine according to an embodiment of the present disclosure.

FIG. 1 is a flow diagram to describe a manufacturing method for an engine according to an embodiment of the present disclosure. As illustrated in FIG. 1, in the method of the present embodiment, a cylinder head material of the engine is cast first (step S1). The cylinder head material has a ceiling surface of a combustion chamber on its surface. Note that, when a cylinder head manufactured by the method of the present embodiment is assembled to a cylinder block, the combustion chamber is defined as a space surrounded by a bore surface of the cylinder block, a top surface of a piston accommodated in the bore surface, a bottom surface of the cylinder head, and bottom surfaces of umbrella portions of an intake valve and an exhaust valve disposed in the cylinder head.

The cylinder bead material includes at least an intake port in which the intake valve is disposed, and an exhaust port in which the exhaust valve is disposed. In step S1, for example, a plurality of cores to form the intake port and the exhaust port is disposed inside a casting mold. Subsequently, molten metal of aluminum alloy is poured into the casting mold. An object taken out of the casting mold after solidification of the molten metal is the cylinder head material. Note that such a casting method of the cylinder head material is well known as disclosed in Japanese Patent Application Publication No. 2000-356165 (JP 2000-356165 A), for example, and therefore, further descriptions thereof are omitted herein.

Subsequently to step S1, the cylinder head material is machined (step S2). In step S2, holes to which valve guides for supporting stem parts of the intake valve and the exhaust valve and seat rings where the umbrella portions of the valves are seated are attached are formed by perforation machining. In step S2, a hole into which the after-mentioned positioning pin is inserted, a hole for fastening the cylinder head material to the cylinder block, an oil passage through which lubricant flows, and the like are also formed by perforation machining. Further, in step S2, cutting is performed on inner surfaces of the intake port and the exhaust post formed in step S1. After such machining, the valve guides and the seat rings are inserted into their corresponding holes by press-fitting, shrink fitting, or cold fitting.

Figure 2:
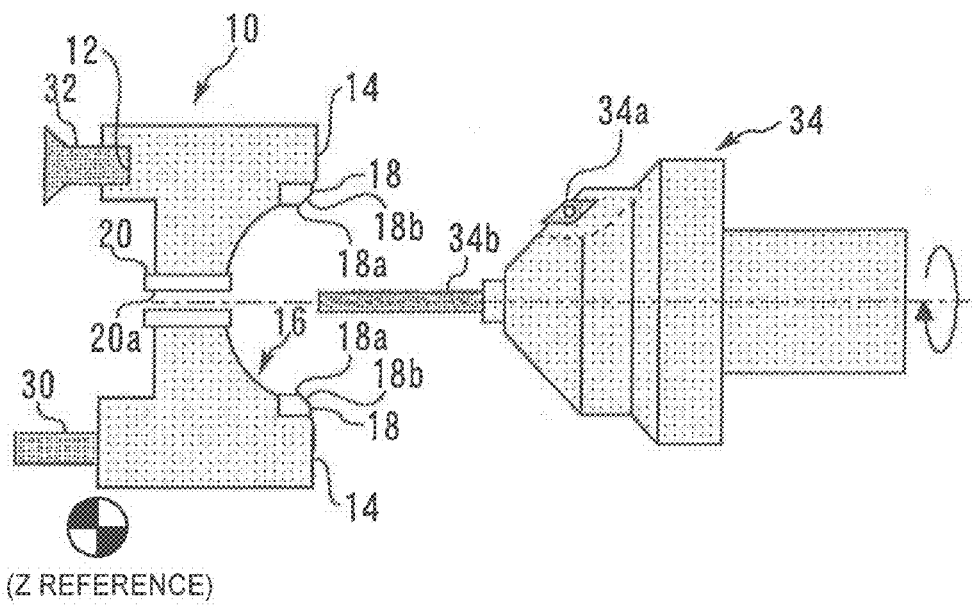
FIG. 2 is a view to describe an example of cutting of inner peripheral surfaces of a valve guide and a seat ring.

When the valve guides and the seat rings are inserted, cutting is performed on inner peripheral surfaces of the valve guides and the seat rings. An example of the cutting on the inner peripheral surfaces of the valve guides and the seat rings will be described below with reference to FIG. 2. In this example, the cutting is performed after a cylinder head material 10 is fixed to a machining stage 30. As illustrated in FIG. 2, the cylinder head material 10 has a hole 12. The hole 12 is formed in step S2. A positioning pin 32 for X, Y references, provided in the machining stage 30, is inserted into the hole 12. Hereby, the cylinder head material 10 is fixed to a reference position (a Z reference) of the machining stage 30.

A part of a ceiling surface 14 of a combustion chamber of the cylinder head material 10 is drawn in FIG. 2. Further, FIG. 2 illustrates only one port (the intake port or the exhaust port) 16 of the cylinder head material 10, and a seat ring 18 as described in step S2 is inserted into an opening on a ceiling surface 14 side of the port 16. Further, a valve guide 20 as described in step S2 is inserted into a hole communicating with the port 16.

A tool 34 used for the cutting includes a cutting tool 34a that cuts an inner peripheral surface 18a of the seat ring 18, and a reamer 34b that cuts an inner peripheral surface 20a of the valve guide 20. The inner peripheral surface 20a is cut such that the reamer 34b is rotated and moved forward. Subsequently, the reamer 34b is moved backward and the cutting tool 34_a_ is rotated and moved forward, so that a valve sitting face 18_b_ is formed on the inner peripheral surface 18_a_.

Figure 3:
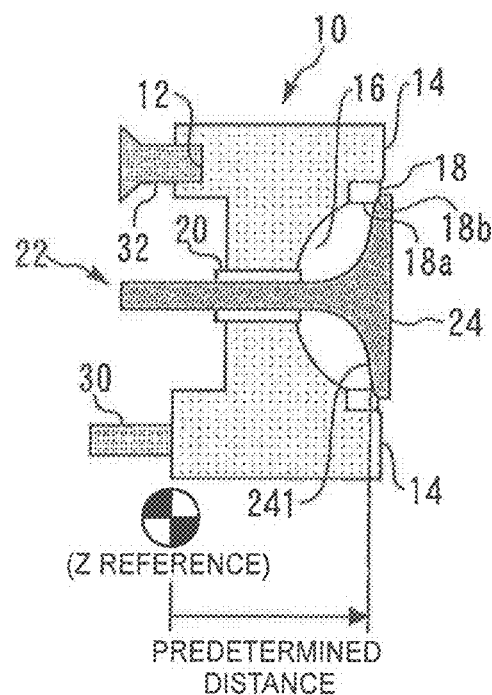
FIG. 3 is a view to describe a cylinder head material 10 in which an engine valve 22 is placed temporarily after the cutting of the inner peripheral surfaces of the valve guide and the seat ring.

In the example illustrated in FIG. 2, the movement of the tool 34 in a rotation-axis direction of the cutting tool 34_a_ is limited so that a dimension from a border between the inner peripheral surface 18_a_ and the valve sitting face 18_b_ to the reference position (the Z reference) becomes a predetermined value. That is, a cutting amount of the inner peripheral surface 18_a_ by the cutting tool 34_a_ is uniform. Accordingly, a distance from the reference position on the top surface of the valve umbrella portion at the time when the engine valve (the intake valve or the exhaust valve) is seated on the valve sitting face 18_b_ is generally uniform. This point will be described below with reference to FIG. 3. FIG. 3 is a view to describe the cylinder head material 10 in which an engine valve 22 is temporarily placed after the cutting of the inner peripheral surfaces 18_a_, 20_a_. As illustrated in FIG. 3, when an umbrella portion 24 is seated on the valve sitting face 18_b_, a top surface 241 of the umbrella portion 24 is distanced from the reference position (the Z reference) only by a predetermined distance.

Referring back to FIG. 1, the following continues the description of the manufacturing method. Subsequently to step S2, a thermal insulation film is formed on a ceiling surface of the combustion chamber (step S3). In step S3, the thermal insulation film is formed as follows, for example. First, nickel-chromium-based ceramic particles are thermally sprayed on the entire ceiling surface. Subsequently, zirconia particles are thermally sprayed on an entire surface of a nickel-chromium-based film. By performing the thermal spraying at two stages, a thermal spraying film including a nickel-chromium-based intermediate layer and a front surface of zirconia can be formed as the thermal insulation film. The thermal spraying film has a porous structure derived from inner air bubbles formed in a course of the thermal spraying. Thus, the thermal spraying film functions as a thermal insulation film having a lower coefficient of thermal conductivity and a lower volume heat capacity than the cylinder head material. A method of the thermal spraying is not limited in particular, and various methods such as flame spraying, high velocity flame spraying, arc thermal spraying, plasma spraying, and laser thermal spraying can be employed.

Note that, in step S3, instead of thermally spraying the nickel-chromium-based ceramic particles and zirconia particles, an appropriate combination of ceramic particles of silicon nitride, yttria, titanium oxide, or the like and composite ceramic particles of cermet, mullite, cordierite, steatite, or the like may be thermally sprayed. Further, in step S3, an anodized film may be formed on the ceiling surface. An application film of thermal insulation paint including hollow particles may be formed on the ceiling surface. An inorganic silica film having air holes due to a foaming agent may be formed on the ceiling surface. These films have a porous structure similarly to the thermal spraying film, and function as a thermal insulation film having a lower coefficient of thermal conductivity and a lower volume heat capacity than the cylinder head material. Further, in step S3, an application film of thermal insulation paint or an inorganic silica film may be formed on the ceiling surface. Although these films do not have a porous structure, they function as a thermal insulation film having a lower coefficient of thermal conductivity than the cylinder head material.

In step S3, a film thickness of the thermal insulation film to be formed on the ceiling surface is adjusted to a range of 50 μm to 200 μm so as to correspond to target thermophysical properties (the coefficient of thermal conductivity and the volume heat capacity). Note that minute irregularities derived from the porous structure might be formed on the surface of the thermal insulation film. Accordingly, in order to adjust the film thickness of the thermal insulation film, it is desirable to perform grinding for the purpose of smoothing of a film surface. Note that the grinding more than required leads to damage on the thermal insulation film because of the structure of the thermal insulation film, and therefore, even if the grinding aims for the smoothing. It is desirable to perform the grinding within a minimum range.

Figure 4:
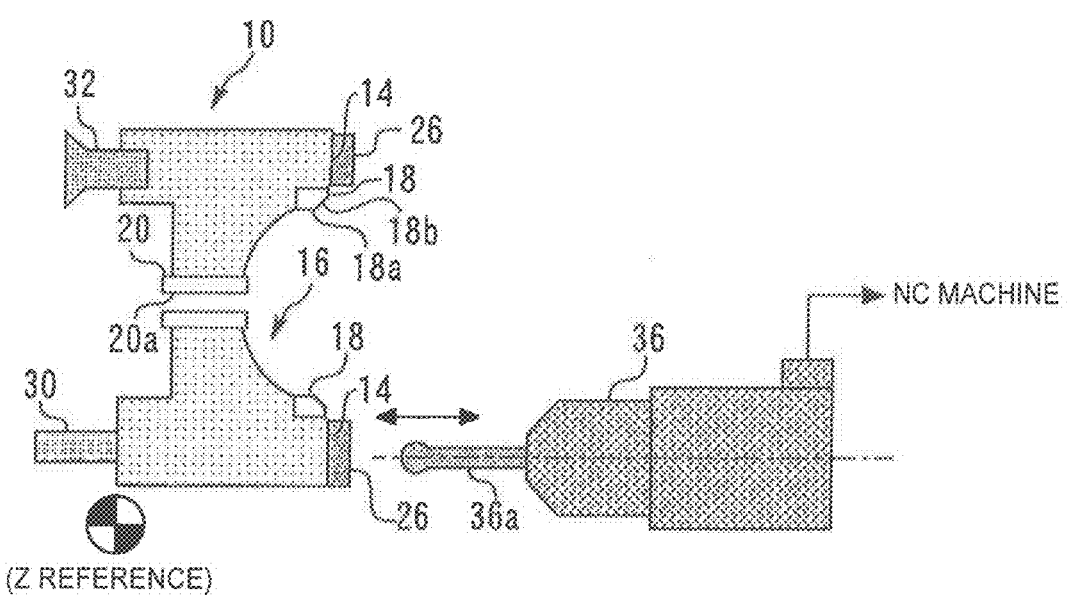
FIG. 4 is a view to describe an example of a film-thickness measurement technique of a thermal insulation film in step S4 in FIG. 1.
Figure 5:
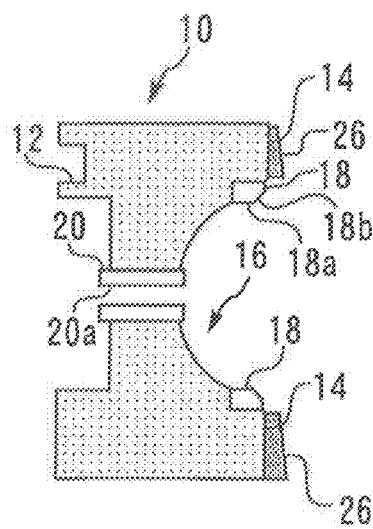
FIG. 5 is a view to describe an example in which the thermal insulation film is inclined relative to a ceiling surface of the combustion chamber.

Subsequently to step S3, the film thickness of the thermal insulation film is measured (step S4). FIG. 4 is a view to describe an example of a film-thickness measurement technique of the thermal insulation film. As illustrated in FIG. 4, a thermal insulation film 26 as described in step S3 is formed on the ceiling surface 14. A coordinate measuring unit 36 mounted to an NC (Numerical Control) machine is opposed to the thermal insulation film 26. A probe 36_a_ of the coordinate measuring unit 36 is moved to a vicinity of the thermal insulation film 26, so that a coordinate of the thermal insulation film 26 in a film-thickness direction is measured. A measured value of the coordinate is output to a controller of the NC machine and recorded. It is desirable that the measurement of the coordinate by use of the coordinate measuring unit 36 be performed on several parts of the thermal insulation film 26. This is because the thermal insulation film 26 might be inclined relative to the ceiling surface 14, as illustrated in FIG. 5. For example, if the measurement of the coordinate is performed on several parts and an average value between them is found, it is possible to find the film thickness of the thermal insulation film 26 more accurately.

Note that, in step S4, instead of measuring the film thickness of the thermal insulation film 26 by use of the coordinate measuring unit 36 illustrated in FIG. 4, the film thickness of the thermal insulation film 26 may be measured by use of a well-known instrument such as a laser displacement gauge, an unevenness measurement using a line laser beam, and an eddy-current film thickness gauge.

Referring back to FIG. 1 again, the following continues the description of the manufacturing method. Subsequently to step S4, a rank for an engine valve to be used in combination with the ceiling surface is selected (step S5). In step S5, a volume of the thermal insulation film is calculated from a product of the film thickness of the thermal insulation film measured in step S4 and an area of the formed film, for example. When the thermal insulation film has a porous structure, the volume is calculated as a volume of a whole film including inner pores. Since a region where the thermal insulation film is formed in step S3 is known in advance, it is basically not necessary to measure the film formation area. For example, in a case where the thermal insulation film is formed on the whole ceiling surface, a surface area of the ceiling surface is assumed the film formation area. Note that, in a case where the volume of the thermal insulation film should be calculated accurately, the film formation area may be calculated by measuring the coordinate of the thermal insulation film by use of the coordinate measuring unit 36 illustrated in FIG. 4 and the like.

Figure 6:
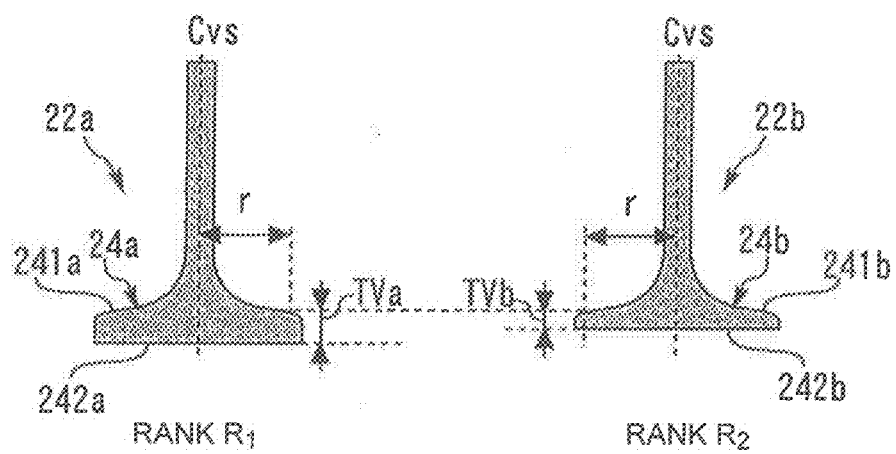
FIG. 6 is a view illustrating examples of two engine valves of different specifications only in terms of thicknesses of their umbrella portions.

The rank for the engine valve, selected in step S5, is a rank corresponding to a thickness of an umbrella portion. FIG. 6 is a view illustrating examples of two engine valves of different specifications only in terms of the thicknesses of the umbrella portions. Two engine valves 22_a_, 22_b_ illustrated in FIG. 6 include umbrella portions 24_a_, 24_b_, respectively. The umbrella portion 24a includes a top surface 241a and a bottom surface 242a, and the umbrella portion 24b includes a top surface 241b and a bottom surface 242b. A thickness TVa of the umbrella portion 24a indicates a distance from the top surface 241a to the bottom surface 242a at a position distanced from a center $C_{vs}$ of a valve stem only by a radius r. A thickness TVb of the umbrella portion 24b indicates a distance from the top surface 241b to the bottom surface 242b at a position distanced from the center $C_{vs}$ only by the radius r.

When the thicknesses TV of the umbrella portion 24a and the umbrella portion 24b illustrated in FIG. 6 are compared with each other, the umbrella portion 24b (the thickness TVb) is thinner than the umbrella portion 24a (the thickness TVa). The engine valve 22a having the thickness TVa is classified to a rank $R_1$, for example, and the engine valve 22b having the thickness TVb is classified to a rank $R_2$, for example. Note that FIG. 6 exemplifies the ranks $R_1$, $R_2$ as the rank for the engine valve, but it goes without saying that the number of ranks for the engine valve, targeted for the selection in step S5, can be set to 3 or more.

Figure 7:
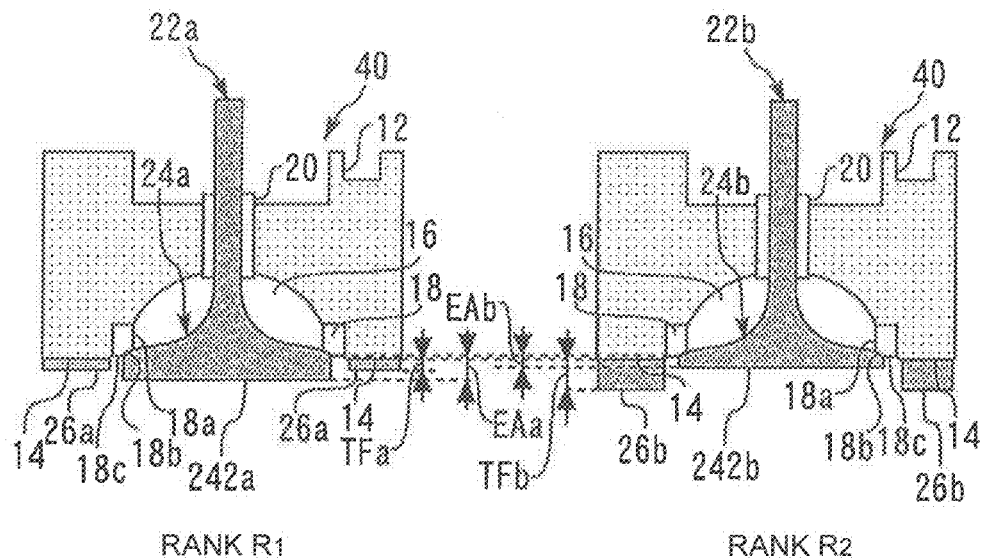
FIG. 7 is a view schematically illustrating examples of engines in combination of respective engine valves with respective ceiling surfaces of combustion chambers on which respective thermal insulation films having different film thicknesses are formed.

For example, in step S5, an engine valve at a rank that can minimize an amount of difference of a capacity of the combustion chamber from its designed value in a case where an umbrella portion of the engine valve is seated on the valve sitting face is selected. The amount of difference is caused due to an amount of difference of the volume of the thermal insulation film, calculated in step 5, from its designed value. The designed value of the volume of the thermal insulation film is set in advance as a volume of a thermal insulation film to be formed on the ceiling surface in consideration of the film thickness and the film formation area to be adjusted in step S3. FIG. 7 is a view schematically illustrating examples of engines in combination of respective engine valves with respective ceiling surfaces of combustion chambers on which respective thermal insulation films having different film thicknesses are formed. Note that FIG. 7 focuses on one port 16 of the cylinder head 40, and the cylinder block and the piston are omitted.

When film thicknesses TF of a thermal insulation film 26a and a thermal insulation film 26b illustrated in FIG. 7 are compared with each other, the thermal insulation film 26b (a film thickness TFb) is thicker than the thermal insulation film 26a (a film thickness TFa). In view of this, for example, the engine valve 22a at the rank $R_1$, which is relatively thick, is used for the thermal insulation film 26a in combination. Further, for example, the engine valve 22b at the rank $R_2$, which is relatively thin, is used for the thermal insulation film 26b in combination. Hereby, a projection amount EAb of the engine valve 22b into the combustion chamber is smaller than a projection amount EAa of the engine valve 22a into the combustion chamber. As such, in both engines illustrated in FIG. 7, respective volumes of their combustion chambers fall within a predetermined range. Note that the projection amount EAa indicates a volume of the umbrella portion 24a on a combustion chamber side based on an annular bottom surface 18c of the seat ring 18 when the umbrella portion 24a is seated on the valve sitting face 18b. Similarly, the projection amount EAb indicates a volume of the umbrella portion 24b on the combustion chamber side based on the annular bottom surface 18c when the umbrella portion 24b is seated on the valve sitting face 18b.

Referring back to FIG. 1 again, the following continues the description of the manufacturing method. Subsequently to step S5, the rank for the engine valve, selected in step S5, is marked on the cylinder head (step S6). This mark is recorded on the surface of the cylinder head, which is visible from outside, as information indicative of the rank for the engine valve to be used in combination with the ceiling surface. This information is recorded by stamping of a mark or by engraving of a mark by laser machining, for example. A QR code (registered trademark) may be used instead of the mark. Further, instead of the mark, identification by the position or the number of notches may be used. By recording such information, a selection of an engine valve at an optimum rank for the combination with the ceiling surface is allowed at the time of assembling an engine. Also at the time of replacing the engine valve with a new one, a selection of an engine valve at the optimum rank for the combination with the ceiling surface is allowed.

With the method according to the present embodiment, an optimum rank for an engine valve to be used in combination with the ceiling surface can be determined based on the volume of the thermal insulation film formed on the ceiling surface. Accordingly, at the time of assembling the engine, a deviation of the capacity of the combustion chamber from its designed value due to a deviation of the volume of the thermal insulation film formed on the celling surface from its designed value is offset, so that the capacity of the combustion chamber can fall within the predetermined range. Further, with the method according to the present embodiment, the optimum rank for the engine valve can be recorded on the cylinder head. Accordingly, it is possible to prevent the capacity of the combustion chamber from deviating from the predetermined range not only at the time of assembling the engine, but also at the time of replacing the engine valve with a new one.

Figure 8:
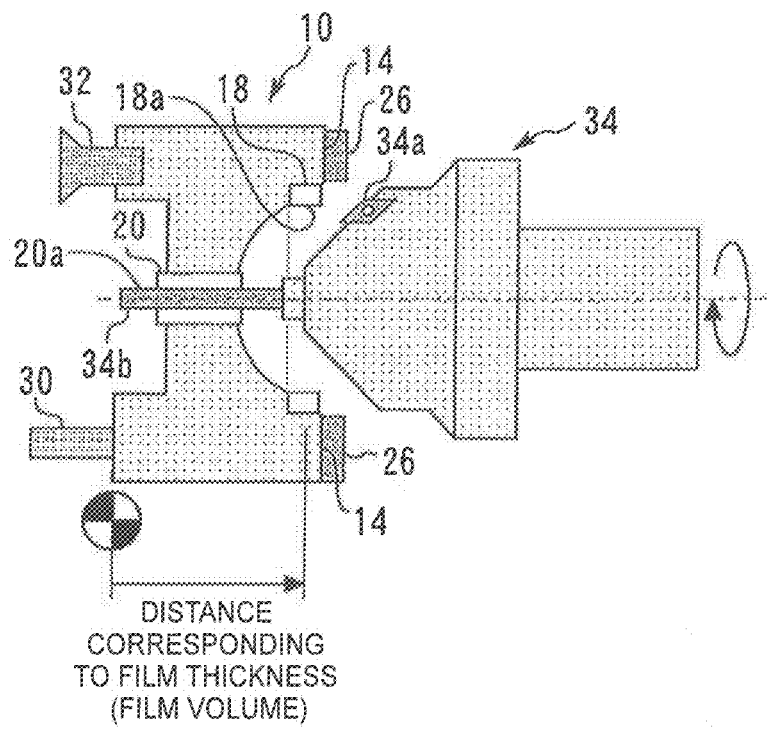
FIG. 8 is a view to describe an example of a manufacturing method for an engine in comparison with the manufacturing method according to the embodiment of the present disclosure.

FIG. 8 is a view to describe an example of a manufacturing method for an engine as a comparison with respect to the manufacturing method according to the present embodiment. In the comparative example illustrated in FIG. 8, inner peripheral surfaces 18a, 20a are cut by a tool 34 after a thermal insulation film 26 is formed on a ceiling surface 14. Further, in the comparison example, a cutting amount of the inner peripheral surface 18a is adjusted in correspondence with a difference between a film thickness (a film volume) of the thermal insulation film 26 and its designed value. Thus, according to the comparative example, a capacity of a combustion chamber can fall within a predetermined range similarly to the method according to the present embodiment. However, in order to perform the cutting illustrated in FIG. 8, it is necessary to perform a process of the cutting at least after step S5 in FIG. 1. This increases the number of process steps and increases a cost. In this regard, the method according to the present embodiment has such an advantage that a process of the machining can be completed in step S2 of FIG. 1.

In the meantime, the above embodiment is described without specifying whether the engine valve 22 illustrated in FIG. 2 and the like is the intake valve or the exhaust valve. This is because the present disclosure is applicable to both the intake valve and the exhaust valve. Note that, in a case of an engine that places great importance on intake efficiency or exhaust efficiency, the present disclosure may be applied to selection of a valve disposed in a port different from a port that makes much of the efficiency. Further, in a case of an engine that generates a swirl in a combustion chamber, the present disclosure may be applied to selection of an exhaust valve not to an intake valve disposed in a tangential port or a helical port. In other words, in a case where there is a special purpose about intake or exhaust in a stage of an engine design, the present disclosure may be applied to an engine valve other than a target engine valve.

Further, the above embodiment has been described on the premise of selecting an engine valve at a rank that minimizes an amount of difference of a capacity of a combustion chamber from its designed value in a case where an umbrella portion of the engine valve is seated on a valve sitting face, the amount of difference being caused due to an amount of difference of a volume of a thermal insulation film from its designed value. However, even in a case of an engine valve at a rank that is different from the rank that minimizes the amount of difference of the capacity of the combustion chamber from the designed value, if the engine valve belongs to a rank that can consequently put the capacity of the combustion chamber within the predetermined range in combination with the ceiling surface (e.g., an engine valve at an rank that secondly minimizes the amount of difference of the capacity of the combustion chamber from the designed value), the engine valve can be selected instead of the engine valve at the rank that minimizes the amount of difference of the capacity of the combustion chamber from the designed value. That is, if an engine valve belongs to a rank for an engine valve used in combination with the ceiling surface and corresponding to the amount of difference of the volume of the thermal insulation film from the designed value, the engine valve can be selected instead of the engine valve at the rank that minimizes the amount of difference of the capacity of the combustion chamber from the designed value.

Further, the above embodiment has been described on the premise of selecting one engine valve at the rank that minimizes the amount of difference of the capacity of the combustion chamber from its designed value, the amount of difference being caused due to the amount of difference of the volume of the thermal insulation film from its designed value. However, the present disclosure may be applied to a plurality of engine valves disposed in a common combustion chamber. In this case, it is preferable that engine valves at the rank that minimizes the amount of difference of the capacity of the combustion chamber from the designed value be selected from combinations of the plurality of engine valves. To select the engine valves from the combinations of the plurality of engine valves means that the amount of difference of the capacity of the combustion chamber from the designed value is shared by umbrella portions of these engine valves. This accordingly yields such an advantage that a deviation of a projection amount of each of the umbrella portions from its designed value can be reduced, and an occurrence of malfunction along with a change in a thickness of an umbrella portion can be restrained in the whole combustion chamber where the umbrella portion is disposed.

Note that in the above embodiment, steps S1, S2 of FIG. 1 correspond to a "preparing step" of the one aspect of the present disclosure, step S3 corresponds to a "film formation step" of the one aspect of the present disclosure, step S4 corresponds to a "measurement step" of the one aspect of the present disclosure, and step S5 corresponds to a "selection step" of the one aspect of the present disclosure. Further, in the above embodiment, step S6 of FIG. 1 corresponds to a "recording step" of the one aspect of the present disclosure.

What is claimed is:

1. A manufacturing method for an engine, comprising:
    preparing, as a preparing step, a cylinder head having a surface on which a ceiling surface of a combustion chamber is formed;
    forming, as a film formation step, a thermal insulation film on the ceiling surface;
    measuring, as a measurement step, a volume of the thermal insulation film; and
    selecting, as a selection step, a rank for an engine valve to be used in combination with the ceiling surface so as to correspond to an amount of difference of a measured volume of the thermal insulation film from a designed value of a volume of the thermal insulation film, the rank being selected from a plurality of ranks set in correspondence with thicknesses of umbrella portions of engine valves, wherein
    the rank for the engine valve to be selected in the selection step is a rank having a thickness of an umbrella portion, the thickness minimizing an amount of difference of a capacity of the combustion chamber from a designed value of the capacity of the combustion chamber in a case where the umbrella portion of the engine valve is seated on a valve sitting face, the amount of difference being caused due to the amount of difference of the measured volume of the thermal insulation film from the designed value.

2. The manufacturing method according to claim 1, further comprising:
    recording information on the rank selected in the selection step on the surface of the cylinder head.

3. The manufacturing method according to claim 1, wherein
    the thermal insulation film formed in the film formation step is a thermal insulation film having a porous structure.

4. The manufacturing method according to claim 1, wherein:
    the forming of the thermal insulation film and the selecting of a rank for an engine valve includes:
    selecting a rank for an engine valve having a relatively greater thickness of an umbrella portion after forming the thermal insulation film having a relatively smaller thickness; and
    selecting a rank for an engine valve having a relatively smaller thickness of an umbrella portion after forming the thermal insulation film having a relatively greater thickness.

* * * * *